United States Patent [19]

Degenkolb et al.

[11] 4,228,013

[45] Oct. 14, 1980

[54] METHOD AND APPARATUS FOR RECOVERY OF HEAVY METAL IONS FROM DILUTE AQUEOUS SOLUTION

[75] Inventors: David J. Degenkolb, Mission Hills; Fred J. Scobey, Hollywood, both of Calif.

[73] Assignee: De luxe General, Incorporated, Los Angeles, Calif.

[21] Appl. No.: 945,652

[22] Filed: Sep. 25, 1978

Related U.S. Application Data

[60] Continuation of Ser. No. 801,493, May 13, 1977, abandoned, which is a division of Ser. No. 764,669, Feb. 1, 1977, Pat. No. 4,137,290.

[51] Int. Cl.² .................... B01D 15/04; B01D 15/06; B01J 1/09
[52] U.S. Cl. .................................... 210/264; 210/277; 210/279; 210/288; 137/592; 137/599
[58] Field of Search ............... 210/264, 269, 275, 277, 210/278, 279, 288, 138, 134, 102, 35, 24, 30, 32; 137/590, 592, 599, 599.1, 599.2

[56] References Cited

U.S. PATENT DOCUMENTS

| | | | |
|---|---|---|---|
| 2,993,508 | 7/1961 | Wagner | 210/278 X |
| 3,451,554 | 6/1969 | Wade | 210/288 X |
| 3,704,785 | 12/1972 | Marsh | 210/288 X |
| 3,747,768 | 7/1973 | Barrera | 210/288 |
| 3,815,747 | 6/1974 | Clack et al. | 210/288 X |

*Primary Examiner*—Ferris H. Lander
*Attorney, Agent, or Firm*—Harry R. Lubcke

[57] ABSTRACT

Heavy metal ions are recovered from a dilute aqueous solution by flowing the solution through either a single bed of ion-absorbing material in successive forward and reverse directions, or through a first bed of ion-absorbing material and thereafter through a second bed of ion-absorbing material in the reverse directon of flow. The reversal of flow is to periodically mechanically agitate a bed of ion-absorbing material to dislodge contaminants, such as gelatin.

The method is accomplished by using one enclosed vessel, or a pair of enclosed vessels, that have valves to control the direction of flow. A timing device preferably automatically reverses the direction of flow about each hour.

After a relatively large number of reversals of flow the heavy metal ions are recovered from the ion-absorbing material and the same is regenerated in the process to again absorb ions from the dilute aqueous solution.

9 Claims, 6 Drawing Figures

METHOD AND APPARATUS FOR RECOVERY OF HEAVY METAL IONS FROM DILUTE AQUEOUS SOLUTION

This is a continuation of application, Ser. No. 801,493, filed on May 13, 1977, now abandoned, which is a division of Ser. No. 764,669, filed Feb. 1, 1977, now U.S. Pat. No. 4,137,290.

BACKGROUND OF THE INVENTION

This invention pertains to metallurgy, and more specifically to separating out heavy metal ions from a solution.

In order to recover silver from photographic processing solutions the prior art has caused such solutions to flow through a tank, say from top to bottom only, and radially through convolutions of zinc-coated window screen contained within the tank. Through simple galvanic cell action the silver displaces the zinc on the screen. The silver in the form of a sludge is later recovered from the bottom of the tank.

Experimental procedures have been undertaken for the absorbtion of silver by ion-exchange resins. This has been in connection with bleach-fix solutions, as "Regeneration of Ferric-EDTA-Thiosulfate Bleach-Fix Solution by Anion-Exchange Resins", H. Iwano et al, (Japan), "Journal of Applied Photographic Engineering", Vol. 2, No. 2, pgs. 65–69, Spring 1976.

This procedure has been for a spent bleach-fix solution containing 4.32 grams of silver per liter, a relatively very large amount.

The paper concludes with the statement:

"The new regeneration system presented here still has some problems that have to be solved before introduction to practical applications but it may provide an improvement for pollution abatement."

Another experimental procedure was performed in Britain, utilizing 200 millileters of resin in a 23 millimeter diameter tube.

Further prior art efforts include a paper approved for public release; distribution unlimited, by the Air Force Weapons Laboratory, New Mexico, entitled "Development and Application of Ion Exchange Silver Recovery System", by A. Buyers et al, May 1974.

The Conclusions contain certain information, such as:

"I. a. (4) Operation of an ion exchange process for removal of silver at concentrations of 0.05 gm/l or less requires over ten times the quantity of resin as found by Buyers (ref. 3); this quantity is probably impractical for Air Force applications. Therefore, the ion exchange process should be evaluated at fix bath silver concentrations of between 0.05 gm/l and 0.50 gm/l."

"b (1) Inorganic anion exchange resin fouling resulting from repetitive silver stripping from spent photographic fix solutions may have been caused by the electrostatic neutralization on the resin exchange sites of colloidal silver sulfide and elemental sulfur which are formed by the acid induced decomposition of thiosulfate and silver thiosulfate ions. Other colloids would neutralize exchange sites in a similar manner."

"c. Ion Exchange, Rinse Water Process

Removal of silver from rinse water by ion exchange appears to be feasible from a theoretical standpoint; however, the ability to directly discharge rinse water following ion exchange treatment will depend largely upon the limits of silver removal attainable with the ion exchange unit together with discharge standards imposed upon Air Force facilities. Lower limits of silver removal by ion exchange have not been established as yet."

Still further efforts were reported in the Russian paper from "TexHuka KuHo u TeAceaudeHuA," 1962, 6, pp. 59–62; in which Conclusion 5, as translated, reads:

"5. At a given moment the manufactured uses of ion exchanging resins for the absorbtion of silver from washing waters is still unprofitable because of the high cost of anionite, just as the filters, saturated with silver, must be burnt. The wide instillation of ionites for seizing silver from the washing waters gets propogation or lowers their cost, or when deciding on the problem of seizing silver without burning the resin."

It is known in the trade that an ion exchange silver recovery system was installed in a commercial film-developing laboratory. However, the resin packed together and the flow of water was reduced. This caused a backup of the outflow water from the processing machine and spoiled film being processed, so that the recovery system was summarily removed from the plant.

It appears from all of the above that the prior art had not reached a workable method or apparatus, such as has been achieved in the present invention.

SUMMARY OF THE INVENTION

A commercially practical continuous flow heavy metal ion recovery system for dilute aqueous solutions is made possible by employing a processing vessel and directing the flow so that the liquid passes down through the vessel. Then the flow is reversed, so that the flow is up through the vessel, thus physically agitating the resin material. About every hour the direction of flow is reversed. Such a structure and procedure is mandatory for an aqueous solution carrying traces of gelatin, or an equivalent, as is commonly found in the solutions of a film processing laboratory.

Typically, pairs of vessels are used and the flow is directed so that the liquid passes down through one vessel and upward through the other vessel so as to continuously agitate the resin in the second vessel. About every hour this flow is also reversed.

Several pairs of vessels are often used, so that one pair may be taken off line for regeneration and the heavy metal recovered, after approximately 200 hours of continuous operation.

All processes can be arranged to be automatic.

Silver, chromium, and iron are examples of recovery in anionic form. Gold and uranium may be recovered in cation form in mining.

Normally, the pairs of vessels are connected to the input feed in parallel. However, when plural heavy metal ions are to be recovered, pairs may be connected in series. The material absorbs the ion for which it has the greatest affinity in the first of the pair of vessels.

When dilute aqueous solutions containing different heavy metal ions are separately available, separate duplicate systems are indicated.

DESCRIPTION OF THE PREFERRED EMBODIMENTS

Figure 1:
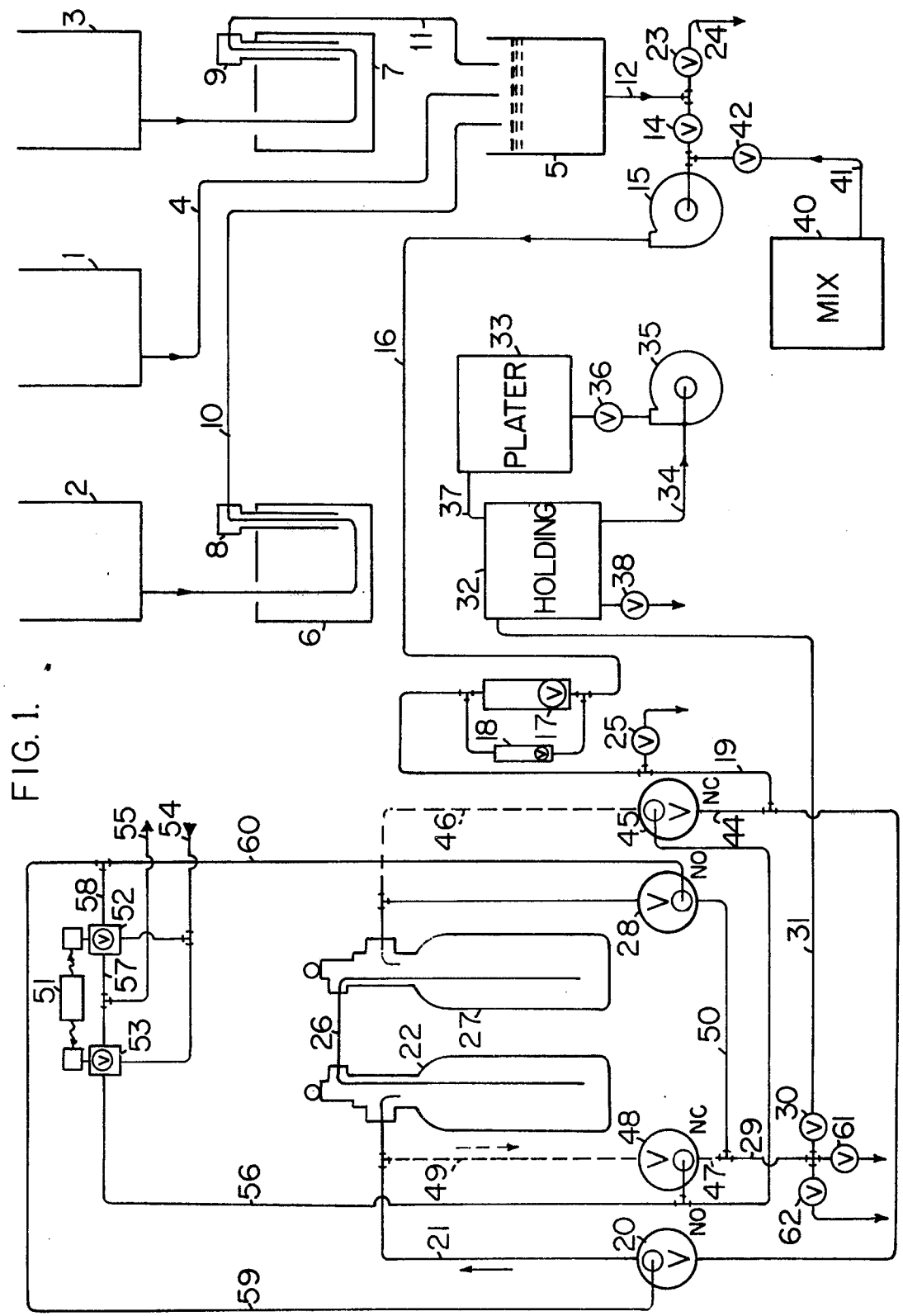
FIG. 1 is a schematic block diagram of the whole apparatus, showing significant elements in elevation.

In FIG. 1, heavy metal ions originate in photographic processing machines 1, 2, 3, such as for developing color motion picture film. The ion is silver.

Processing machine 1 is regarded as located close to the recovery apparatus, thus, pipe 4 leads directly to collector tank 5.

Processing machines 2 and 3 are regarded as remotely located in the laboratory, and so these feed transfer tanks 6 and 7, respectively. Submersible pumps are employed to move the effluent from the transfer tanks to collector tank 5. These are pump 8 for tank 6, with discharge through pipe 10, and pump 9 for tank 7, with discharge through pipe 11.

All of these tanks have at least partially open tops with provision for containing and passing of any overflow, should such happen because of malfunctioning of the subsequent apparatus not accepting the normal flow of effluent from the processing machines.

This provision is of major importance in apparatus of this kind. If the ion recovery apparatus should "back up", the normal discharge from the processing machines would cease if the two were directly connected and spoilage of solutions and/or film being processed would result.

The dilute aqueous solution in tank 5 passes from it through pipe 12, normally open valve 14, pump 15, flow meters 17 and 18, pipe 19, hydraulically operated valve 20, pipe 21, and into vessel 22, to begin the recovery process. Pump 15 exerts enough pressure to provide a flow that is typically ⅛ to 1/6 the volume of the resin, per minute. This pressure is of the order of 2.8 kilograms per square centimeter.

A drain valve 23 for tank 5 is connected to pipe 12, and via pipe 24 a bypass to the sewer is provided to drain away any liquid that must be eliminated from the system.

Another valve 25 is teed from pipe 19 to allow sampling of this part of the system for reasons of set-up or emergency. The dilute aqueous solution passes from vessel 22 through pipe 26 into second vessel 27, and thence through hydraulically operated valve 28 and a pipe cross fitting through valve 61 to the main drain, since the heavy metal ion has now been removed from the solution. At this time, adjacent valves 30 and 62 are closed.

After about two-hundred hours of operation upon the dilute aqueous solution the silver is recovered in metallic form in silver plater 33. The treated silver-bearing solution from holding tank 32, largely silver chloride, passes therefrom through pipe 34, pump 35, and through valve 36 into the silver plater. A return pipe 37 runs from the silver plater to the holding tank, and the latter has a drain valve 38.

A mix tank 40 is utilized for holding the regenerative solution for the ion-absorbing material 67 and 67' in vessels 22 and 27. See FIG. 2. This solution is introduced into the system when required via pipe 41 and valve 42. This valve is normally closed, but when regeneration is to be performed, valve 14 is closed, valve 42 is opened, and pump 15 is operated to pass the regenerative solution to the vessels.

In order for the flow of the dilute aqueous solution to be reversed through vessels 22 and 27, two more hydraulically operated valves 48 and 45 and appropriate plumbing are employed.

Pipe 19 also connects to pipe 44, which latter connects to the third hydraulically operated valve 45. The discharge side of the latter valve is connected to vessel 27 through pipe 46. The significant reverse flow pipes are shown dotted for identification in FIGS. 1, 2 and 6.

For accomplishing the reverse flow, valve 20 is closed and valve 45 is opened. Similarly, valve 28 is closed and valve 48 is opened.

As to structure, pipe 29 is teed into pipe 17, which is connected to fourth hydraulically operated valve 48. The inlet side of this valve is teed into pipe 21 by pipe 49.

It is seen that with this configuration the flow of the dilute aqueous solution through vessels 22 and 27 is reversed.

The relatively large capacity hydraulically operated valves previously described are preferably actuated by water pressure controlled by relatively small solenoid operated valves.

The solenoid valves are, in turn, preferably actuated by an electrical timer. Of course, large solenoid, motor, pneumatic, or manually operated valves may be employed where a secondary factor dictates.

Accordingly, in FIG. 1, element 51 is an electric timer of any type that is suited to give repeated electrical outputs each 60 minutes, and to allow the time period to be adjusted by perhaps 15 minutes plus or minus.

Two similar solenoid valves 52, 53 are connected to timer 51 for actuation thereby. Each valve is connected to a reliable source of water, such as a city source 54. The valves may be of ¼" size, with the accompanying piping of ¼" tubing (0.64 centimeters).

An atmospheric drain 55 is also provided, teed into the tubing between the two switches, in order to relieve the pressure from the control lines, as 56, 60, to allow hydraulic valves 28, 48, to open.

Valve 52 is normally energized, thus providing a through opening horizontally. Valve 53 is normally unenergized, thus providing a through opening from the water pressure in connection 54 to the left-hand tubing 56. This pressure in exerted upon the control port of hydraulically operated valves 48 and 45, to close them, thus causing the "direct" flow of the dilute aqueous solution through the vessels from 22 to 27.

Valve 53 does not allow water pressure from connection 54 to be exerted at the right-hand tubing connection 57. Thus, there is no pressure through valve 52, nor in tubings 58, 59, or 60, and so valves 20 and 28 are open.

Upon receiving impulses from timer 51 after a suitable interval, such as 60 minutes during continuous operation of the apparatus at a rate of 60 liters per minute, valve 52 is unenergized and valve 53 is energized. This removes the pressure from tubing 56 and applies pressure to tubings 58, 59, and 60.

Hydraulically operated valves 20 and 28 are closed and valves 48 and 45 are opened. A "reversed" flow of the dilute aqueous solution through the vessels from 27 to 22 thus occurs. The ion-absorbing material in vessel 22 is thus agitated by an up-from-the-bottom flow, rather than the same occurring in vessel 27, as prior.

The outflow of relatively pure and heavy metal ion-free water is discharged from the apparatus through valve 61, which is normally open and connects to a main drain or sewer. An additional valve 62 is typically also provided in order to obtain samples of the discharge water for observation or analysis.

When the regeneration cycle previously mentioned is performed, main drain valve 61 is closed. In addition, valve 30 is opened to let the regeneration solution accumulate in holding tank 32.

In silver plater 33 a voltage of 0.6 volt DC is sufficient to accomplish the recovery of the metallic silver on electrodes therein. This occurs because the solution present in plater 33 contains silver chloride AgCl.

To recover the silver from the rinse water of a photographic processing machine, with the silver in anionic form of silver thiosulfate, the preferred regenerative solution is ammonium chloride, $(NH_4)Cl$, in a 5 molal concentration. Between regeneration cycles the ammonium chloride is stored in holding tank 32, since the solution may be used again and again.

Figure 2:
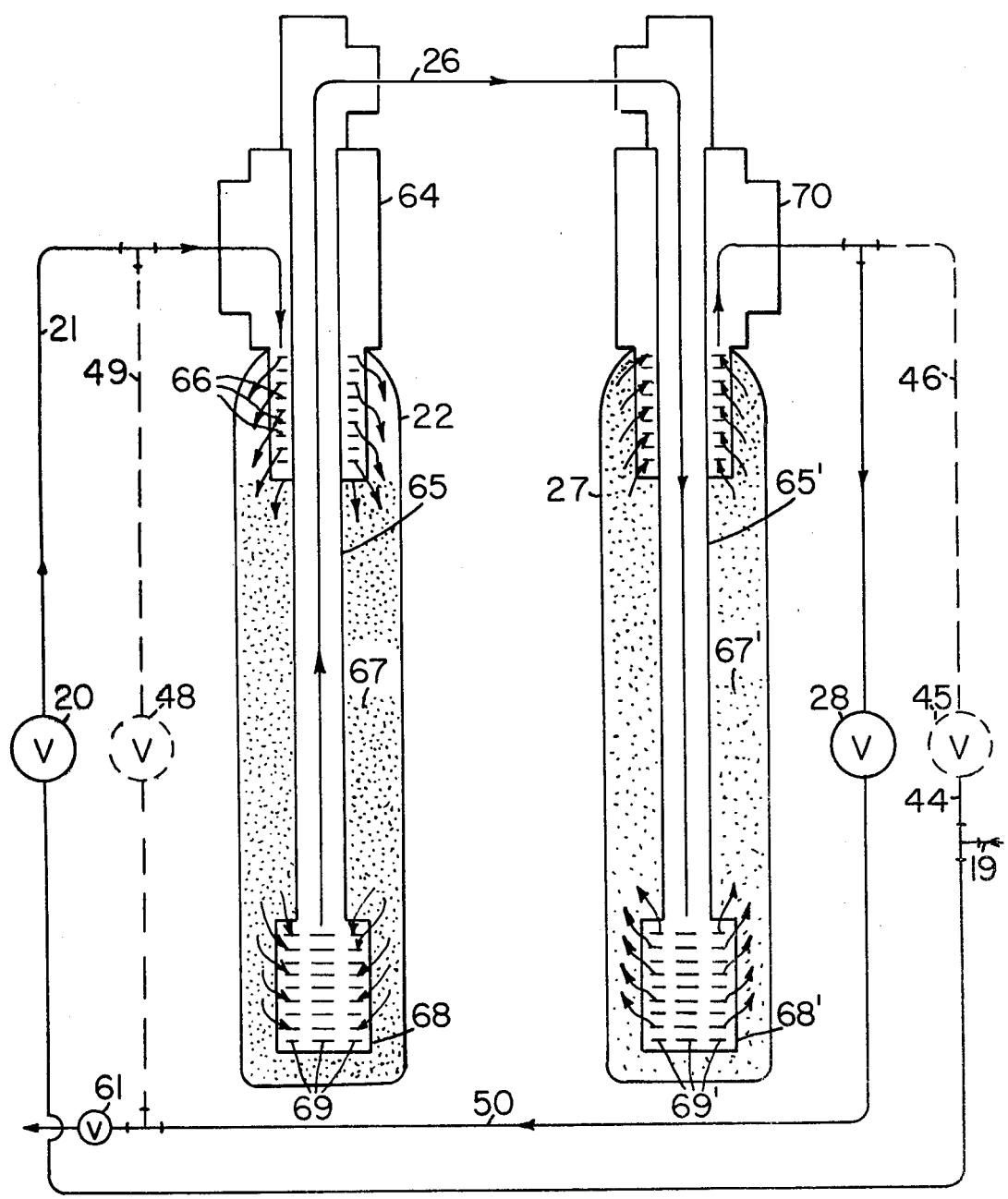
FIG. 2 is a structural sectional view of a pair of vessels, showing the interconnection by plumbing and the flow of liquid through the ion-absorbing material.

FIG. 2 is an enlarged sectional elevation view of the two vessels 22 and 27 of FIG. 1.

In FIG. 2, inlet pipe enters annular first internal pipe 64. The showing is partly schematic, with the thickness of the pipes and of the vessels omitted. Pipe 64 surrounds second internal pipe 65, and has multiple orifices that have the preferred form of narrow slits 66. The width of each slit is less than the grain size of ion-absorbing material 67 so that this material will not be lost due to the flow of the dilute aqueous solution.

A preferred such material is a resin that is a cross-linked polystyrene with quaternary ammonium functional groups of the general formula $R\ C_6H_4\ CH_2\ N(CH_3)_3Cl$. This is commercially obtainable as Duolite A101D ion exchange resin, from the Diamond Shamrock Chemical Co., Nopco Chemical Division, Redwood City, Calif., 94063. A semiporous grade has superior physical flow characteristics and is preferred for use with this invention.

This is a strong base anion resin. Typically, the mobile ion is the chloride, which is exchanged for the silver thiosulfate.

For a cation resin, which is to be exchanged for a metal salt, as in gold or uranium mining, Diamond Shamrock Duolite C25D may be used.

The preferred grain size of the resin is within the range of from 16 to 50 mesh. U.S. Standard Sieve (approximately 1 millimeter). The grain typically has an irregular multifaceted shape.

As a consequence, the open dimension of the width of the several slits 66,69, etc. is approximately 0.3 mm width. The length may be 50 mm for each slit.

The several curved arrows indicate the dilute aqueous solution flowing out of first internal pipe 64. The level of ion-absorbing material (resin) 67 within vessel 22 is illustrative, and it is not totally filling. Typically, each vessel, at 22, has a 151 liter capacity, with a diameter of 40 centimeters and a height of 150 cm for the main body. The volume of resin is 0.113 cubic meters for this size vessel. Of course, these dimensions may be varied, with the capacity to remove ions proportionally affected.

The purpose of not totally filling the vessel is to allow space for physical agitation of the resin when the vessel is "back-flowed", as is shown in vessel 27 in FIG. 2.

Internal pipe 65 terminates at the bottom of vessel 22 with an enlarged cylindrical portion 68, which may have a diameter of 5 cm and a length of 20 cm. It has further multiple orifices 69.

In the direct flow mode, the dilute aqueous solution, now at least partially relieved of heavy metal ions, is shown entering the several slit orifices by curved arrows.

Since vessel 22 is sealed and the aqueous solution is under pressure because of the operation of pump 15 of FIG. 1, the solution passes upward through internal pipe 65 and passes to vessel 27 through schematically represented pipe 26.

In vessel 27 pipe 26 connects to a further embodiment of internal pipe 65, being identified as 65', and having an enlarged cylindrical portion 68', with further multiple orifices 69'. The curved arrows here indicate the aqueous solution passing out of orifices into resin 67'. The schematic showing of less resin material adjacent to these orifices indicates that the resin is physically agitated, displaced, and is in motion at this location. This effect continues upward throughout vessel 27, with the agitation decreasing with upward distance. The resin material does occupy the volume to the top of the vessel in this reverse flow mode, as is shown in FIG. 2.

At the top of vessel 27 the curved arrows enter annular inner pipe 70. This marks the completion of the flow to remove the heavy metal ion from the dilute aqueous solution. The effluent passes externally through valve 28, pipe 50, and thence to an ultimate discharge, being ecologically compatible with the environment.

A prime mode of operation of the apparatus of this invention has to do with the prevention of packing of the ion-absorbing material 67 and hence maintaining a necessary freedom of solution flow by mechanical agitation of the material on alternate hour-long intervals.

It is known that this method allows satisfactory commercial operation approximately sixteen times longer than when the method is not employed.

Figure 3:
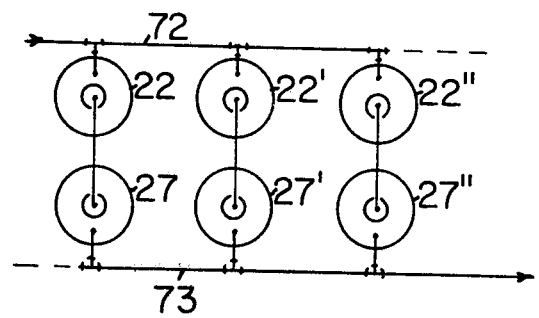
FIG. 3 is a schematic plan view of plural pairs of vessels and the interconnection thereof.

FIG. 3 is illustrative of a large capacity apparatus, in which the pairs of vessels 22 and 27 are duplicated in parallel at 22' and 27', 22" and 27", and so on if desired. One commercial installation has eight such pairs. This gives a flowing capacity of approximately 480 liters per minute. Pipe 72 is illustrative of the dilute aqueous solution input pipe 19 in FIG. 1. Pipe 73 is illustrative of the outlet pipe 29 in FIG. 1.

Flow control valve, having flexible orifices, such as are manufactured the the Dole company, may be placed in the line of each of the parallel pairs 22,27; 22', 27'; 22", 27", etc. to insure that each of these pairs will carry a substantially equal portion of the total flow of the dilute aqueous solution.

Figure 4:
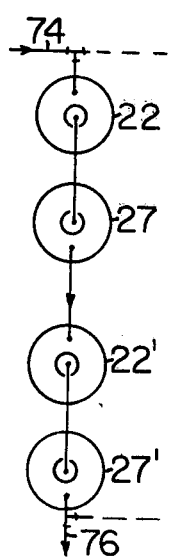
FIG. 4 is the same for two pairs of vessels connected in series.
Figure 5:
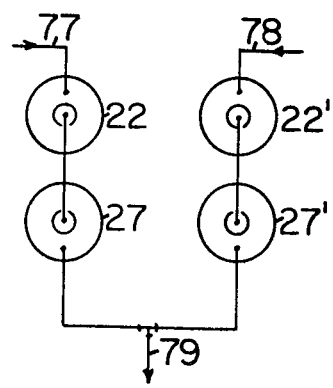
FIG. 5 is the same for two pairs of vessels, each pair receiving a separate input but having a common output.

The additional piping for changing the direction of flow, such as pipes 21, 46, 47, 49, 50 in FIG. 1, has not been shown in the simplified FIGS. 3, 4, 5, but this piping is present for each pair of vessels.

FIG. 4 illustrates a series arrangement of pairs of vessels for removing two different kinds of heavy metal ions.

Such a system is useful for removing first the ferricyanide complex used in color motion picture film processing, and secondly, the silver thiosulfate, as from the hypo wash, in this series arrangement of processing.

In FIG. 4, 74 is the input pipe. Vessel pair 22 and 27 remove the ferricyanide ion. Series-connected thereto by pipe 75 is pair 22' and 27', which remove the silver thiosulfate ion. The suitable resin has a significantly greater affinity for the relatively high concentration of ferricyanide ion than for the silver ion; thus the recited order of processing.

The outlet pipe is 76. The dotted lines adjacent to pipes 74 and 76 indicate that the two pairs of vessels may be duplicated by additional two pairs, as may be desired, in order to increase the throughput of the dilute solution of the apparatus.

Where the two different heavy metal ions discussed with respect to FIG. 4 arise from separate sources, as is possible with the separate tanks in photographic and other processing, the parallel arrangement of pairs of vessels of FIG. 5 may be used.

Pipe 77 conveys one heavy metal ion solution to vessel pair 22 and 27, while pipe 78 conveys another heavy metal ion solution to vessel pair 22' and 27'. The ions may have any affinity for the resin material and the temporary failure of one pair of vessels will not contaminate the other pair of vessels. Also, each separate pair can be duplicated, as shown in FIG. 3, for greater flow capacity.

A single outlet pipe 79 connects to both pairs of vessels in FIG. 5, for a common discharge of typically ecologically-acceptable water.

The concentration of heavy metal ions in the dilute aqueous solution, as silver in thiosulfate wash water, may run from 3 to 50 parts per million, typically. After treatment according to this invention, approximately 90% of the silver present is recovered and prevented from contaminating the ecology. By providing a greater ratio of resin material to flow, 100% of the silver can be removed from the effluent.

Figure 6:
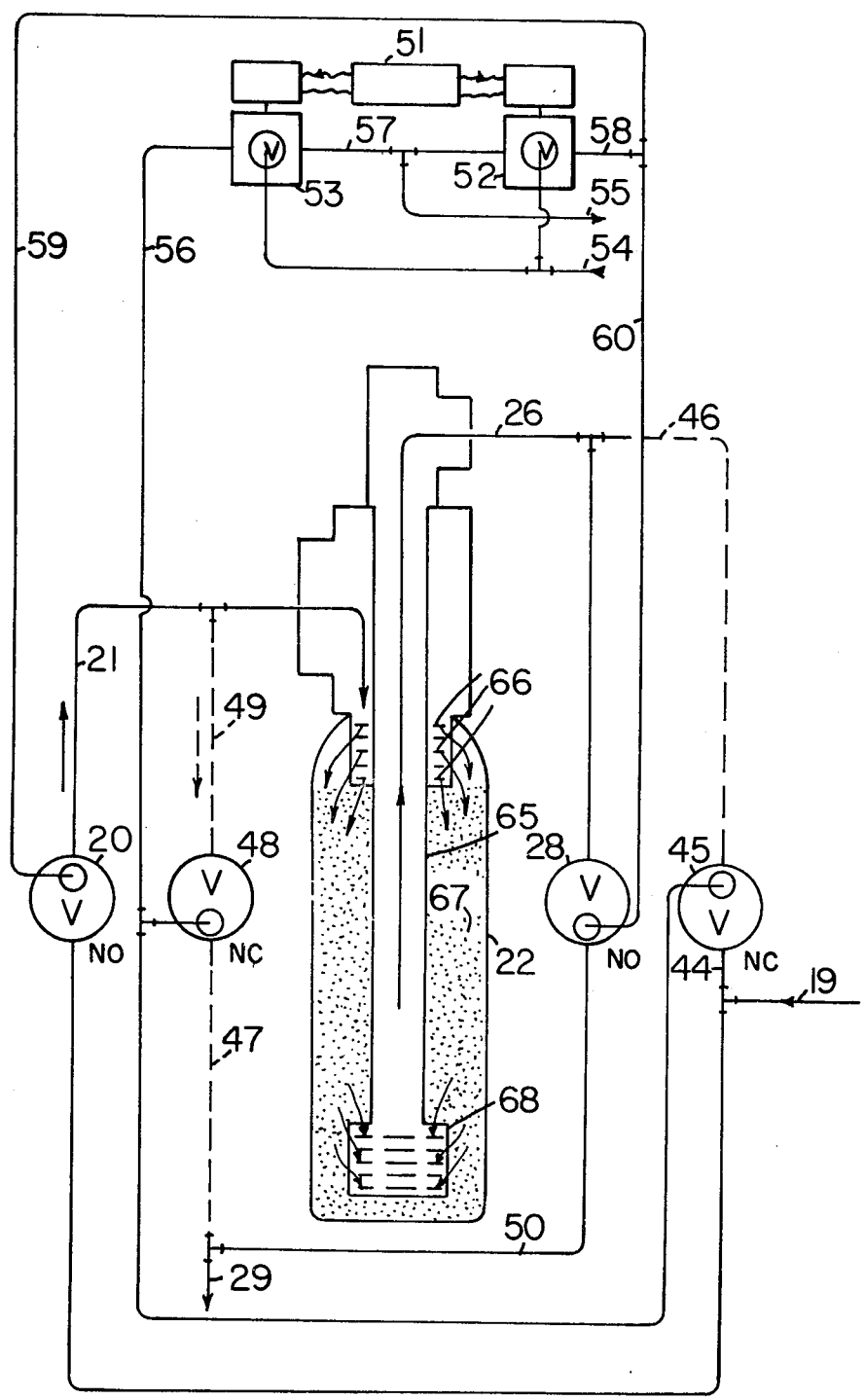
FIG. 6 is a structural section view of a single vessel alternate embodiment.

FIG. 6 is a sectional view of a single vessel alternate embodiment of the invention. The single vessel 22 shown is essentially that of 22 of FIG. 1.

As before, flow-reversing hydraulically operated valves 20, 28, 45, 48 act to reverse the flow through the single vessel. Control solenoid valves 52, 53, or equivalent, and timer 51 act to control the main valves as before.

In effect, pipe 26 is connected to flow-reversing valves 28, 45, rather than to the former second vessel 27.

Timer 51 reverses the flow of the dilute solution, as before, with perhaps a shorter period to match the single bed of resin rather than two beds as in FIG. 1.

FIGS. 3, 4, 5 have illustrated multiple vessel processing assemblies, each showing pairs of processing vessels as the unit. The single processing vessel of FIG. 6 can be substituted for a pair of vessels in any of these assemblies.

While specific data have been given herein by way of example, the size of the vessels and the flow rate may be altered to handle larger or smaller quantities of incoming solution. The volume of resin that has been specified is for the chloride form thereof.

With attainable care and cleanliness, the life of the resins and of the halide or thiocyanate salt regenerant, is substantially limitless.

We claim:

1. Apparatus for recovering a heavy metal ion and a coagulant from a dilute aqueous solution, comprising;
   (a) one closed ion-exchange vessel (22),
   (b) exclusively ion-absorbing material (67) in said vessel,
   (c) centrally disposed enclosed pipe means to pass (21,26,47) said dilute aqueous solution through said vessel;
      (1) a first part of said means to pass extending through the top of said vessel and having a large plurality of separate groups of contiguously disposed circumferentially aligned circularly symmetrical slit orifices (68) at the bottom of said vessel to cause upward physical agitation of said ion-absorbing material to expand said ion-absorbing material to the top of said ion-exchange vessel when the direction of flow is outward from said orifices (68) at the bottom of said vessel,
      (2) a second part of said means to pass surrounding said first part at the top of said vessel and having a large plurality of separate groups of contiguously disposed circumferentially aligned circularly symmetrical slit orifices (66) at the top of said vessel,
      (3) said orifices in said means to pass at the bottom and the top of said vessel being uniformly disposed at one radius approximately half-way between the wall of said vessel and said first and second part of said means to pass to directly disperse a distributed flow of said aqueous solution from said means to pass radially into said ion-absorbing material,
   (d) a plurality of valve means (20,28,45,48) separately disposed in said means to pass said solution to reverse the direction of flow of said solution only through said vessel,
   (e) half of said plurality of valve means to automatically actuate (52,53) all of said plurality of valve means after the passage of an interval of time of approximately an hour, so as to reverse the direction of flow of further said solution through said vessel to prevent clogging of said ion-absorbing material by said coagulant, and
   (f) means to time the actuation (51) of the half plurality of said valve means to actuate (52,53) said plurality of valve means after the passage of each successive said intervals of time.

2. The apparatus of claim 1, in which;
   (a) said plurality of valve means (20,28,45,48) are hydraulically operated valves, and
   (b) the half of said plurality of valve means to actuate (52,53) said valve means are solenoid operated valves, each of which is exclusively connected to two of said hydraulically operated valves, said solenoid operated valves are physically spaced from and hydraulically connected to said hydraulically operated valves and are connected to control water under sufficient pressure to positively operate said hydraulically operated valves.

3. Apparatus for recovering a heavy metal ion and a coagulant from a dilute aqueous solution, comprising;
   (a) a pair of interconnected closed ion-exchange vessels (22,27),
   (b) exclusively ion-absorbing material (67,67') in each of said vessels,
   (c) centrally disposed means to pass (21,26,47) said dilute aqueous solution serially through said vessels;

(1) a first part of said means to pass extending through the tops of said vessels and having a large plurality of separate groups of contiguously disposed circumferentially aligned circularly symmetrical slit orifices (68) at the bottoms of said vessels to cause upward physical agitation of said ion-absorbing material to expand said ion-absorbing material to the top of said ion-exchange vessel when the flow is outward from said orifices (68) at the bottom of a said vessels, (2) a second part of said means to pass surrounding said first part at the tops of said vessels and having a large plurality of separate groups of contiguously disposed circumferentially aligned circularly symmetrical slit orifices (66) at the tops of said vessels, (3) said orifices in said means to pass at the bottom and the top of said vessels being uniformly disposed at one radius approximately half-way between the walls of said vessels and said first and second means to pass, to directly disperse a distributed flow of said aqueous solution from said means to pass radially into said ion-absorbing material, (d) a plurality of valve means (20,28,45,48) separately disposed in said means to pass only said solution, (e) half of said plurality of valve means to automatically actuate (52,53) all of said plurality of valve means after the passage of an interval of time of approximately an hour, so as to reverse the direction of flow of further said solution through said vessels to prevent clogging of said ion-absorbing material by said coagulant, and (f) means to time (51) to successively actuate the half plurality of said valve means to actuate said valve means after the passage of each successive said interval of time.

4. The apparatus of claim 3, in which said enclosed pipe means to pass said solution includes;

(a) a first internal pipe (64) for introducing said solution through orifices disposed to directly disperse said solution at the top of a first said ion-exchange vessel (22), (b) a second internal pipe (65,65') extending from the bottom of said first vessel to the bottom of a second said vessel, said second internal pipe having orifices disposed to directly accept said dispersed solution at the bottom of said first vessel and to directly disperse said solution at the bottom of said second vessel, and (c) a third internal pipe (70) extending from the top of said second vessel for discharging said solution through orifices disposed to directly accept said solution from said second vessel.

5. The apparatus of claim 4, in which;

(a) the bottoms of said second internal pipe (65,65') have enlarged cylindrical portions (68,68') in which slit (66) said orifices (69,69') are carried.

6. The apparatus of claim 3 in which;

(a) plural pairs of said ion-exchange vessels (22,27;22',27') are permanently grouped, and (b) said means to pass (72) said dilute aqueous solution is structured, including orifices that are formed and placed, to essentially simultaneously and equally feed plural said pairs in parallel.

7. The apparatus of claim 3, in which;

(a) said means to pass (74) said dilute aqueous solution essentially continuously feeds said plural pairs in series, so that a heavy metal ion for which a said ion-absorbing material has greater affinity than for other such ions is absorbed largely in the first of said plural pairs.

8. The apparatus of claim 3, in which;

(a) there are plural separate means to pass (77,78) separate dilute aqueous solutions to plural pairs of ion-exchange vessels (22,27; 22',27') so that different heavy metal ions are removed from said separate dilute aqueous solutions, and (b) means-in-common (79) to pass the resulting solutions to a single means for disposal.

9. The apparatus of claim 3, which additionally includes;

(a) a collector vessel (5) for initially receiving said dilute aqueous solution that is structured to allow overflow of said solution.

* * * * *